United States Patent [19]

Lau

[11] 4,205,809

[45] Jun. 3, 1980

[54] TAPE CASSETTE

[76] Inventor: Wan-Yuen Lau, Eastbourne Ct. 6/F, D Flat, 5-7 Eastbourne Rd., Kowloon, Hong Kong

[21] Appl. No.: 960,724

[22] Filed: Nov. 14, 1978

[51] Int. Cl.² .......................... G03B 1/04; G11B 15/32
[52] U.S. Cl. ..................................................... 242/199
[58] Field of Search ............................... 242/197–200; 352/72, 78 R; 360/93, 96, 132

[56] References Cited

U.S. PATENT DOCUMENTS

| 3,991,956 | 11/1976 | Machida | 242/199 |
| 4,078,742 | 3/1978 | Steipe | 242/199 |
| 4,102,514 | 7/1978 | Ito | 242/199 |
| 4,131,243 | 12/1978 | Machida | 242/199 |

FOREIGN PATENT DOCUMENTS 2224344  11/1973  Fed. Rep. of Germany ........... 242/199

*Primary Examiner*—Leonard D. Christian
*Attorney, Agent, or Firm*—Roylance, Abrams, Berdo & Farley

[57] ABSTRACT

A tape cassette comprising a housing, a pair of reels rotatably carried within the housing around which tape can be wound, an access opening for exposing a portion of the tape extending thereacross and between the reels to the exterior of the housing for engagement by a transducer assembly for recording and playing back information on the tape when the cassette is disposed within a tape player, and an assembly for biasing the tape portion in an outward direction with respect to the housing, such assembly comprising a pair of pads adjacent the access opening and spaced along the path of the tape extending across the opening and carried at or adjacent the ends of the arms of a bifurcated leaf spring mounted within the housing adjacent the access opening intermediate the pads such that said pads will resiliently bear on the tape to bias it as aforesaid.

11 Claims, 8 Drawing Figures

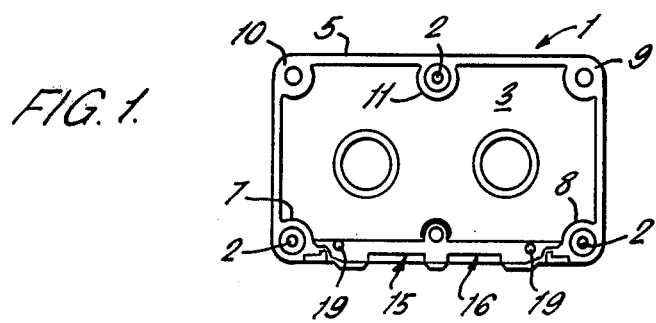
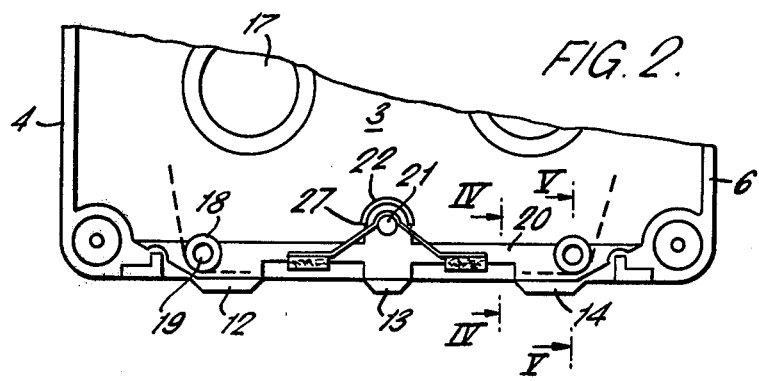
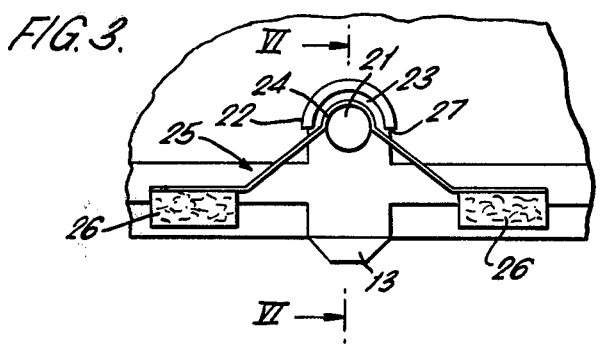
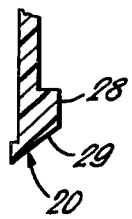
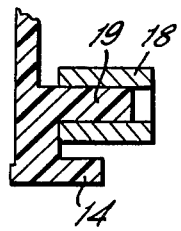
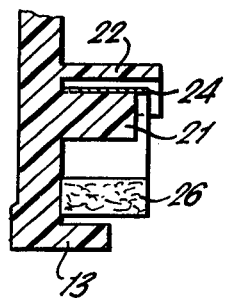

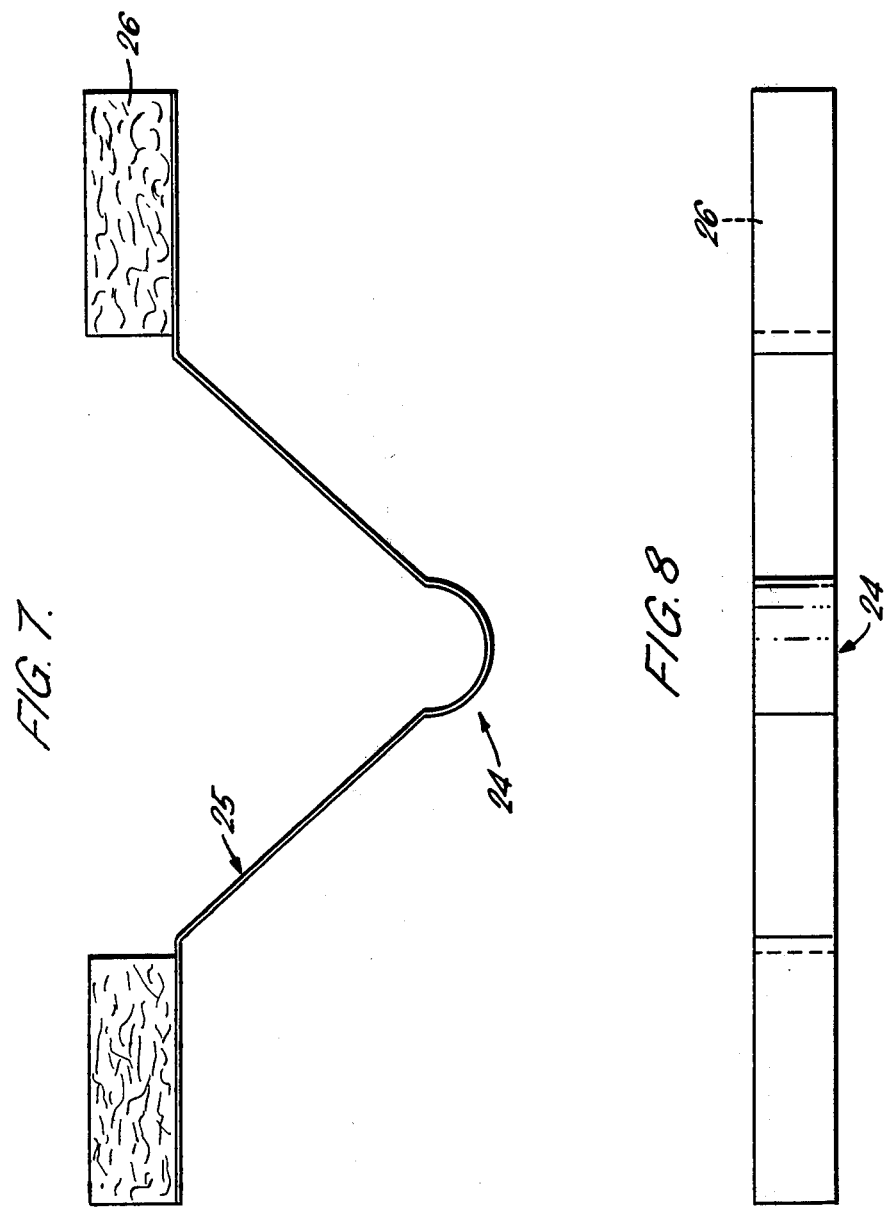

TAPE CASSETTE

FIELD OF THE INVENTION

This invention relates to tape cassettes and particularly, but not exclusively, to tape containers for tape cassettes of the type known as micro cassettes. These cassettes are currently finding particular use in office recording equipment such as dictating machines.

SUMMARY OF THE INVENTION

According to a first aspect of the invention there is provided a tape cassette comprising a housing, a reel within the housing around which tape can in use be wound, an access opening for exposing a portion of the tape extending thereacross in use to the exterior of the housing for engagement by a transducer assembly for recording and playing back information on the tape when the cassette in use is disposed within a tape player, and means for biasing said tape portion in an outward direction with respect to the housing, said biasing means comprising a pair of pads adjacent the access opening and spaced along the path of the tape extending, in use, across the opening and means resiliently supporting said pads so that in use they resiliently bear on the tape to bias it as aforesaid.

The pads are preferably carried at or adjacent the ends of the arms of a bifurcated leaf spring which constitutes the resiliently supporting means and which is mounted within the casing adjacent the access opening intermediate, preferably mid-way between, said pads.

The access opening may be sub-divided into two portions, each pad being disposed adjacent a respective one of said opening portions.

The bifurcated leaf spring is provided for self-adjustment and limitation of the pressure applied, during recording and play back, to the tape, and for maximum effect should be so mounted that a certain amount of rotation of the spring about its centre, from which its two arms extend, causing movement of the pads relative to the opening, is permitted.

This may be achieved by means of a mounting assembly fixed relative to the housing and comprising a spigot, about which the bifurcated leaf spring is arranged for pivoting with its apex adjacent the spigot, and stop means defining limit positions for said pivoting of the spring.

The stop means may comprise an arcuate, preferably part-circular section element extending part way around the spigot to define an arcuate gap in which the said apex is accommodated.

The spigot and arcuate section element may be formed integrally with the housing.

The cassette is preferably provided with tape guide means adjacent opposite edges of the access opening to inhibit lateral displacement of the tape when, in use, it is advanced across said access opening.

Such guide means may comprise a pair of ribs integrally formed with the housing and having respective parallel elongate surfaces which face one another across said access opening and which are spaced by a distance slightly greater than the width of the tape.

Preferably, mounted within the housing are guide rollers round which the tape, in use, advances. A pair of such rollers are preferably mounted adjacent opposite ends of the access aperture, and serve to guide the tape to and from respective ones of a pair of said reels, between which a portion of tape extends across said aperture.

Reference will hereinafter be made to the accompanying drawings which illustrate an embodiment of the invention.

BRIEF DESCRIPTION OF THE DRAWINGS

FIG. 1 is a general plan view of a base part of a tape cassette according to the invention;

FIG. 2 is a part broken view, in enlarged scale of a portion of the base part shown in FIG. 1, with pressure pad assembly and guide rollers mounted thereto;

FIG. 3 is an enlarged view of the pressure pad assembly and mounting assembly therefor of the base part of FIG. 2;

FIGS. 4 and 5 are sections on lines IV—IV and V—V respectively, of FIG. 2;

FIG. 6 is a section on line VI—VI of FIG. 3, and

FIGS. 7 and 8 illustrate, on a much enlarged scale, a bifurcated spring in side and plan views thereof.

DETAILED DESCRIPTION OF THE PREFERRED EMBODIMENT

Although the drawings and following description concern a micro cassette, it will be clear that the present invention is applicable to other forms of tape container such as standard cassettes and cartridges.

A tape cassette comprises a two-part housing, of which only one part, termed herein the base 1, is illustrated. The cover part is similar to the base part 1, apart from the omission of certain elements and modification of others, to be discussed more fully later herein, and is attached, in the assembled cassette, to the base part 1 by means of, for example, three self tapping screws driven into holes 2 through registering larger diameter holes in the cover part. The cover and base parts may be made, for example by injection moulding, from any suitable plastics material, such as polystyrene, ABS, poly-carbonade AS, or by die-casting.

The base part 1 comprises a substantially rectangular flat base wall 3 with upstanding peripheral sidewalls 4,5,6 on three sides thereof. These walls extend between bush-like pieces 7 to 10 at the corners and 11 mid-way along the larger side 5. The holes 2 are formed, in this embodiment, in two such pieces 7,8 at the corners at opposite ends of the front edge of the base wall, and in the piece 11.

Three mutually spaced upstanding flange elements 12,13,14 at this front edge define between them two portions 15,16 of a subdivided access opening for exposing to the exterior of the housing a part of a tape extending between two reels (not shown) mounted in the housing by means of respective spools projecting outwardly through, and held in circular apertures 17 formed in the base wall. This tape portion will pass, substantially as shown in broken lines in FIG. 2, around two guide rollers 18 of, for example copper or nickel, or other metal plated copper rotatably mounted on respective axle pins 19 projecting upwardly from opposite ends of an elongate rib 20 formed along this front edge of the base wall and extending between the pieces 7,8.

Also upstanding from the base wall at a position adjacent and mid-way along the front edge, and behind the central flange portion 13 is a mounting assembly comprising a spigot 21 and a substantially semi-cylindrical stop member 22 coaxial with the pin to define therebetween a half-annular section gap 23. Accommodated within this gap is a semi-circular apex portion 24 of a bifurcated spring, made in this embodiment from bronze strip, each furcation comprising an arm 25 projecting from the apex portion, the distal ends of the arms being bent to align with one another in the unconstrained condition of the spring, as shown most clearly in FIGS. 3 and 7. Each such distal end carries a respective felt pressure pad 26 which is located adjacent a respective one of the access opening portions and which, in use of the cassette, is biased in an outward direction by the spring to urge the portion of tape adjacent that pad at any instant against a record playback or erase head in a tape player.

The bifurcated spring can pivot about the spigot 21 causing one of the pressure pads 26 to move inwardly with respect to its access opening portion and the other to move outwardly. The limits of this rotational, or pivotal movement are reached upon engagement of the respective arms 25 with the diametrically opposite edges 27 of the stop member 22.

FIG. 4 illustrates the sectional configuration of the rib 20 as comprising an elongate surface 28 which in the assembled cassette faces and extends parallel to a similar surface of the cover part, these surfaces being separated by a distance slightly greater than the width of the tape to perform a guiding function on the tape as it advances across the access opening portions between the two reels. An elongate bevel surface 29 extends from the outer edge of the surface 28 to the extreme edge of the base wall. This, together with the corresponding bevel surface of the cover part, define a widening of the outer parts of the access opening portions.

Where the base part 1 is injection moulded, all of the elements illustrated in FIG. 1 can be integrally formed, thereby saving on manufacturing time and cost, assembly of the cassette merely requiring fitting of the bifurcated spring, guide rollers and loaded tape spools, and fixing of the cover part. The latter is similar to the base part, but does not have elements 19,21,22, and certain of the pieces 7 are formed for complementary engagement with the corresponding pieces of the base part to ensure correct registering of these parts before being screwed together as aforesaid.

In use of the cassette on a tape player, recording and erase heads of a transducer head assembly will project into the access opening portions to engage the tape. The bifurcated spring becomes loaded and presses the tape against the transducer heads in such a way as to avoid undue pressure being applied to the tape. The spring effects a balancing of the pressure to achieve smooth running of the tape during recording and playback.

The ribs 20, or more particularly the surfaces 28 thereof constitute tape guide means which inhibit lateral movement of the tape as it advances longitudinally across the access opening during recording, playback, fast wind-on and rewind. This ensures firstly proper positioning of the tape laterally thereof relative to the aforesaid transducer heads, which in turn avoids fluctuations in recorded or played back sound level. It secondly ensures proper winding of the tape onto the spool, which thereby runs smoothly even at the minimum pulling tension obtained when the tape length, as mentioned later herein, is greater than in known cassettes.

The tape runs smoothly round the guide rollers which accordingly reduce friction between the tape and the housing.

The above features in combination provide smoother tape advance and accordingly improved recording, and permit rapid and simple assembly of the cassette.

Further, in addition to the bronze spring being cheap to make and easy to fit, the particular form of the tape biasing spring, as disclosed above, occupies very little space within the housing, and allows larger maximum reel diameter, and accordingly a greater length of tape to be loaded in the cassette. In a particular example, it is possible to load up to 155 feet of C-120 tape having a thickness of 0.009 mm. This represents, for one currently available micro recorder (Philips Model 0095), a total recording time of about 48 minutes, i.e. 24 minutes each side. This compares with a maximum tape length of 120 feet in known micro cassettes, and a maximum recording time of 20 minutes each side. In another example the tape length is 163 feet, giving 25 minutes recording time on each side.

What I claim is:

1. A tape cassette comprising a housing, a reel within the housing around which tape can be wound in use, an access opening for exposing a portion of the tape extending thereacross in use to the exterior of the housing for engagement by a transducer assembly for recording and playing back information on the tape when the cassette in use is disposed within a tape player, and means for biasing said tape portion in an outward direction with respect to the housing, said biasing means comprising a pair of pads adjacent the access opening and spaced along the path of the tape extending, in use, across the opening, and a bifurcated leaf spring having an intermediate apex and a pair of resilient arms extending from said apex, said leaf spring being mounted within the housing adjacent the access opening, said pads being carried at or adjacent the ends of the arms of said bifurcated leaf springs so that in use said pads resiliently bear on the tape to provide said outward bias, said leaf spring being mounted by means of a spring mounting assembly fixed relative to the housing and comprising a spigot and an arcuate stop extending partway round the spigot to define an arcuate gap in which said apex is accommodated so as to permit the leaf spring to pivot at its apex about the spigot within limits defined by the stop.

2. A tape cassette according to claim 1 wherein the access opening is sub-divided into two portions, each pad being disposed adjacent a respective one of said opening portions.

3. A tape cassette according to claim 1 wherein the spigot and arcuate section element are formed integrally with the housing.

4. A tape cassette according to claim 1 wherein mounted within the housing are guide rollers round which the tape, in use, advances.

5. A tape cassette according to claim 4 wherein a pair of said rollers are mounted adjacent opposite ends of the access opening, and serve to guide the tape to and from respective ones of a pair of reels, between which a portion of tape extends said aperture.

6. A tape cassette according to claim 1 and including tape wound on said reel or reels, a portion of said tape extending across said opening and exposed to the exterior of the housing.

7. A tape cassette comprising a housing, a reel within the housing around which tape can be wound in use, an access opening for exposing a portion of the tape extending thereacross in use to the exterior of the housing for engagement by a transducer assembly for recording and playing back information on the tape when the cassette in use is disposed within a tape-player, and means for biasing said tape portion in an outward direction with respect to the housing, said biasing means comprising a pair of pads adjacent the access opening and spaced along the path of the tape extending, in use, across the opening and a bifurcated leaf spring having a pair of resilient arms and mounted within the housing adjacent the access opening said pads being carried at or adjacent the ends of the arms of said bifurcated leaf spring so that in use said pads resiliently bear on the tape to provide said outward bias, said housing including tape guide means to inhibit lateral displacement of the tape when, in use, it is advanced across said access opening, said tape guide means comprising a pair of ribs formed integrally adjacent opposite edges of the access opening and having respective parallel elongate surfaces which face one another across said access opening.

8. A tape cassette according to claim 7, and including tape wound on said reel, a portion of said tape extending across said opening and exposed to the exterior of the housing and wherein said surfaces of said ribs are spaced by a distance slightly greater than the width of the tape and lie adjacent the opposite edges of said portion extending across said opening.

9. A tape cassette according to claim 7 wherein mounted within the housing are guide rollers round which the tape, in use, advances.

10. A tape cassette according to claim 9 wherein a pair of said rollers are mounted adjacent opposite ends of the access opening, and serve to guide the tape to and from respective ones of a pair of reels, between which a portion of tape extends across said opening.

11. A tape cassette according to claim 7 and including tape wound on said reel or reels, a portion of said tape extending across said opening and exposed to the exterior of the housing.

* * * * *